(12) United States Patent
Andrews et al.

(10) Patent No.: US 8,595,839 B2
(45) Date of Patent: Nov. 26, 2013

(54) SELECTING ONE OF A PLURALITY OF SCANNER NODES TO PERFORM SCAN OPERATIONS FOR AN INTERFACE NODE RECEIVING A FILE REQUEST

(75) Inventors: Benjamin L. Andrews, Tucson, AZ (US); David A. Brettell, Vail, AZ (US); Anthony J. Ciaravella, Tucson, AZ (US); Bruce D. Lucas, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 13/011,794

(22) Filed: Jan. 21, 2011

(65) Prior Publication Data

US 2012/0192276 A1    Jul. 26, 2012

(51) Int. Cl.
*G06F 11/00* (2006.01)
*G06F 11/30* (2006.01)
*H04L 29/06* (2006.01)

(52) U.S. Cl.
USPC ............... 726/24; 726/22; 726/23; 713/154; 713/188

(58) Field of Classification Search
USPC .......................................................... 726/24
See application file for complete search history.

(56) References Cited

U.S. PATENT DOCUMENTS

| | | | |
|---|---|---|---|
| 7,023,861 B2 * | 4/2006 | Makinson et al. ............ 370/401 |
| 7,580,974 B2 | 8/2009 | Wei et al. | |
| 7,711,669 B1 | 5/2010 | Liu et al. | |
| 2003/0110391 A1 * | 6/2003 | Wolff et al. .................. 713/200 |
| 2005/0114429 A1 * | 5/2005 | Caccavale .................... 709/200 |
| 2005/0149749 A1 * | 7/2005 | Van Brabant ................ 713/200 |
| 2006/0288416 A1 | 12/2006 | Costea et al. | |

(Continued)

FOREIGN PATENT DOCUMENTS

| | | |
|---|---|---|
| CN | 101014016 | 8/2007 |
| GB | 2436161 | 9/2007 |
| WO | 2009059420 | 5/2009 |

OTHER PUBLICATIONS m3p, Talk Stats, looking for algorithm for weighted random choice, Nov. 22, 2008, http://www.talkstats.com/showthread.php/6432-looking-for-algorithm-for-weighted-random-choice.*

(Continued)

*Primary Examiner* — Andrew L Nalven
*Assistant Examiner* — Khang Do
(74) *Attorney, Agent, or Firm* — David W. Victor; Konrad, Raynes, Davda & Victor LLP

(57) ABSTRACT

Provided are a computer program product, system, and method for selecting one of a plurality of scanner nodes to perform scan operations for an interface node receiving a file request. A list includes a plurality of scanner nodes in a network and for each scanner node a performance value. One of the scanner nodes in the list is selected based on the performance values of the scanner nodes and the file is transmitted to the selected scanner node to perform a scan operation with respect to the file. Indication is received from the selected scanner node performing the scan operation whether a subset of code in the file matches code in a definition set. The file request is processed to result in execution of the file request based on the indication of whether the subset of code in the file matches a definition in the definition set.

22 Claims, 8 Drawing Sheets

(56) References Cited

U.S. PATENT DOCUMENTS

2007/0192481 A1   8/2007   Wei et al.
2007/0240214 A1*  10/2007  Berry .......................... 726/22
2009/0249102 A1*  10/2009  Yong et al. .................. 713/324
2009/0268617 A1   10/2009  Wei et al.
2011/0096679 A1*  4/2011   Hayashino et al. .......... 370/252

OTHER PUBLICATIONS

P. Mell, "THe NIST Definition of Cloud Computing (Draft)", National Institute of Standards and Technology, Special Publication 800-145 (draft), Jan. 2011, pp. 1-7.

Patent Abstract for CN101014016, Published on Aug. 8, 2007, 1 pp.

R. Khalil et al., "A Study of Network Security Systems", IJCSNS International Journal of Computer Science and Network Security, vol. 10 No. 6, Jun. 2010, 204-212 pp.

P. Efraimidis et al., Weighted Random Sampling (2005; Efraimidis, Spirakis), 4 pgs.

IBM, Sonas product overview, (online), (Retrieved from the Internet on Jan. 3, 2011), Retrieved from the Internet at URL: http://publib.boulderibm.com/infocenter/sonasidsonaslic/advanced/print, 69 pgs.

J. Farmer., "20bits" (online), Retrieved from the Internet at URL: http: 20bits.com/articles/random-weighted-elements-in-php/, dated Feb. 7, 2008, 8 pgs.

IBM, "Symantec Endpoint Protection for IBM SONAS", IBM Systems and Technology Group Solution Brief, Feb. 2010, 4 pgs.

IBM, "IBM Scale Out Network Attached Storage Type 2851 Administrator's Guide", 240 pgs., 2010, doc. No. GA32-0713-01.

IBM, "IBM Scale Out Network Attached Storage Architecture, Planning, and Implementation Basics", International Technical Support Organization, dated Dec. 2010, 562 pgs., doc. No. SG24-7875-00.

IBM, "IBM Scale Out Network Attached Storage Concepts", International Technical Support Organization, dated Nov. 2010, 172 pgs., doc. No. SG24-7874-00.

B. Jaim et al., "IBM Sonas with VMware Best Practices for a Virtualized Environment", Technical Report, IBM System and Technology Group, dated Jun. 2010, 53 pgs.

* cited by examiner

Scanner Node List Entry

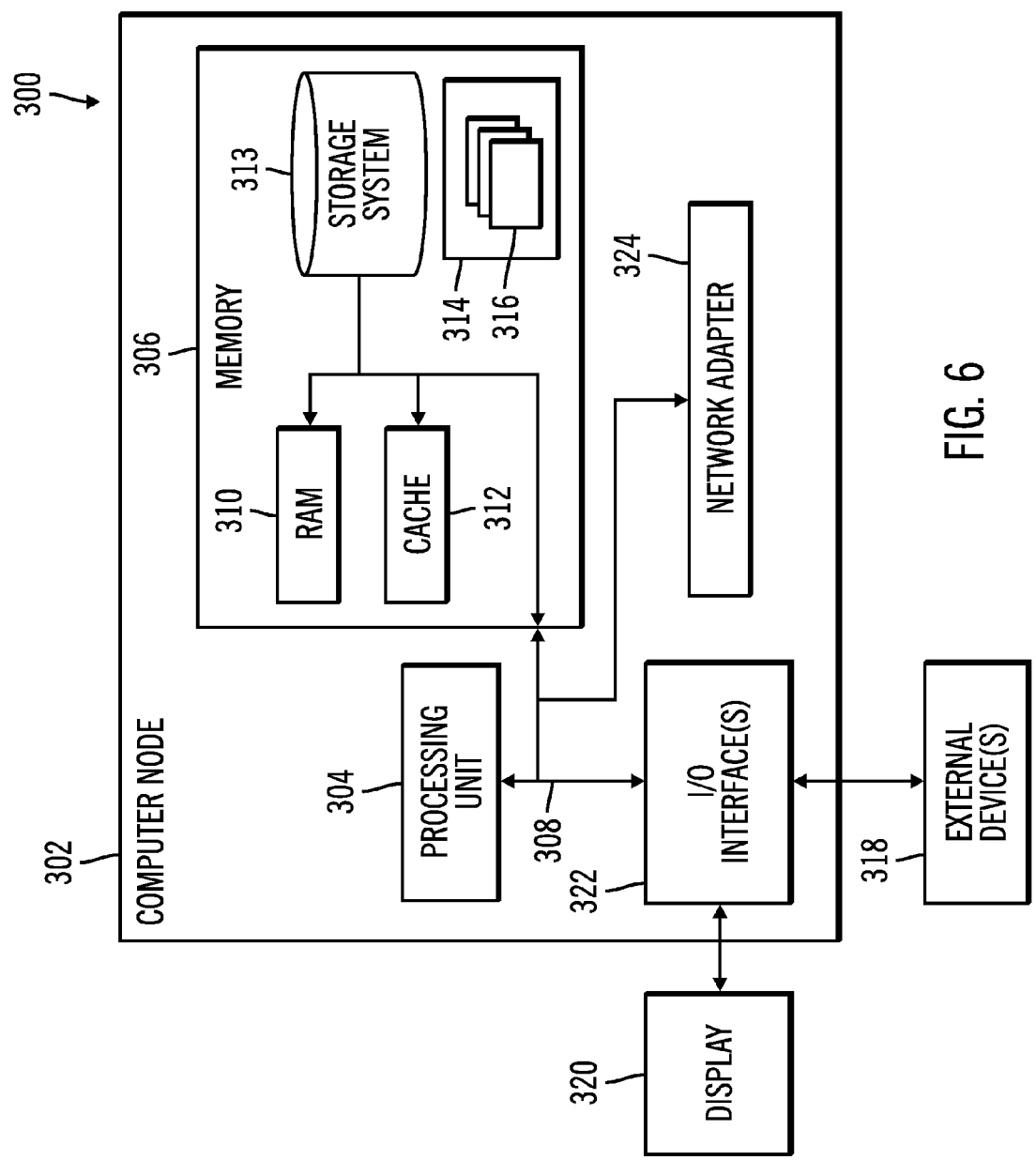

US 8,595,839 B2

SELECTING ONE OF A PLURALITY OF SCANNER NODES TO PERFORM SCAN OPERATIONS FOR AN INTERFACE NODE RECEIVING A FILE REQUEST

BACKGROUND OF THE INVENTION

1. Field of the Invention

The present invention relates to a computer program product, system, and method for selecting one of a plurality of scanner nodes to perform scan operations for an interface node receiving a file request.

2. Description of the Related Art

In a network storage environment, such as the Scale Out Network Attached Storage (SONAS), offered by International Business Machines Corporation (IBM), multiple interface nodes may provide connections between multiple storage nodes providing storage services and client nodes issuing file requests to access the storage resources and services available through the storage nodes. To provide protection against viruses and malicious code, the client nodes may run an anti-virus program to scan files before sending files to the interface nodes to forward to a storage node. In further implementations, the client may forward the file to an anti-virus server to scan the file and return to the client before the client node forwards the file to an interface node to provide to a storage node. (IBM is a registered trademark in the United States and other countries of International Business Machines Corp.).

There is a need in the art for improved techniques for handling the scanning of a file from a client node in a network environment.

SUMMARY

Provided are a computer program product, system, and method for selecting one of a plurality of scanner nodes to perform scan operations for an interface node receiving a file request. A list includes a plurality of scanner nodes in a network and for each scanner node a performance value. A file request is received with respect to a file. In response to the file request, one of the scanner nodes in the list is selected based on the performance values of the scanner nodes. The file is transmitted to the selected scanner node to perform a scan operation with respect to the file. Indication is received from the selected scanner node performing the scan operation whether a subset of code in the file matches code in a definition set. The file request is processed to result in execution of the file request based on the indication of whether the subset of code in the file matches a definition in the definition set.

BRIEF DESCRIPTION OF THE DRAWINGS

FIG. 6 illustrates an implementation of a node in the network computing embodiment.

DETAILED DESCRIPTION

Figure 1:
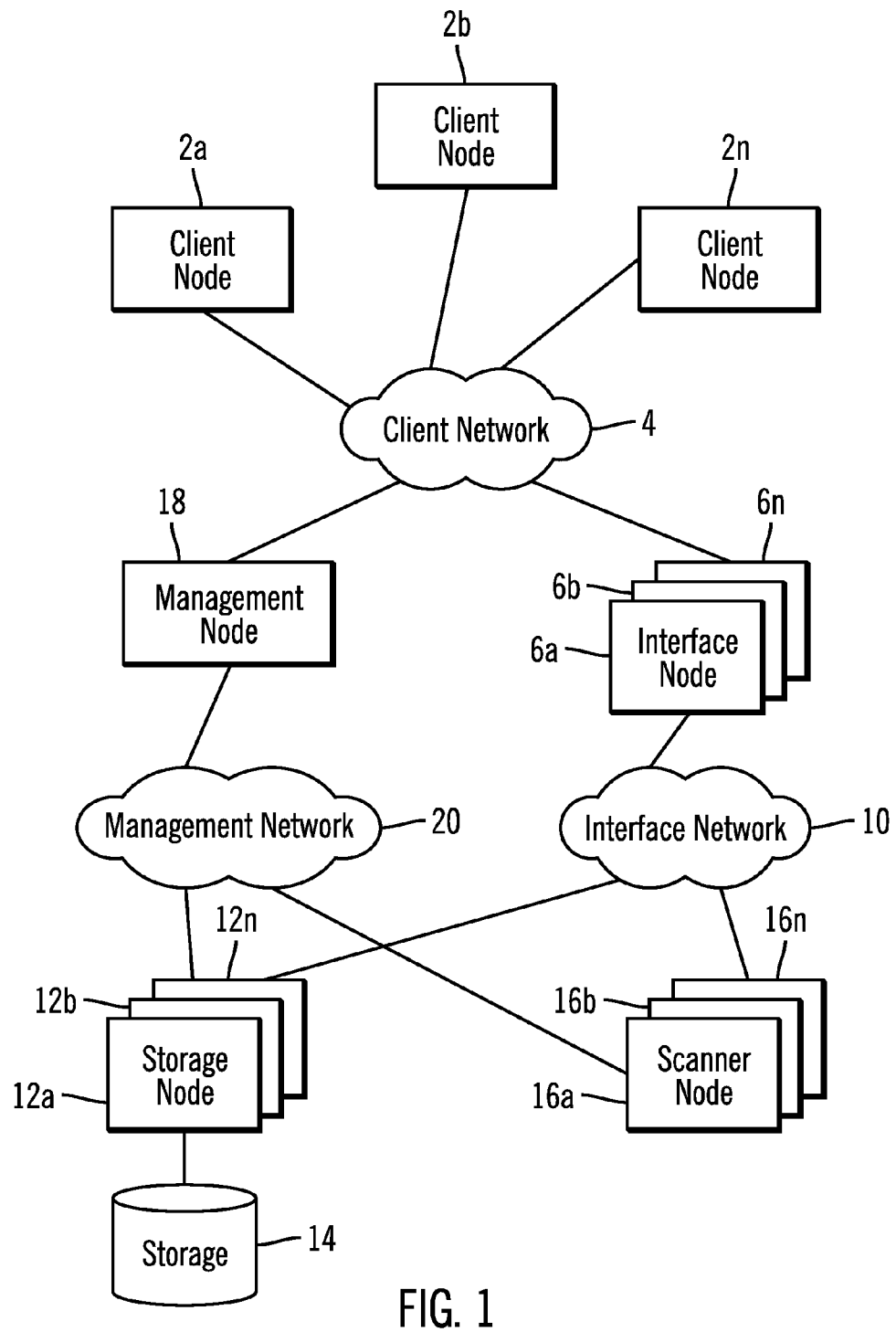
FIG. 1 illustrates an embodiment of a network computing environment.

FIG. 1 illustrates an embodiment of a network storage environment. The environment includes one or more client nodes $2a, 2b \ldots 2n$, a client network 4, one or more interface nodes $6a, 6b \ldots 6n$, an interface network 10 to connect the interface nodes $6a, 6b \ldots 6n$ to one or more storage nodes $12a, 12b \ldots 12n$ that provision storage resources with respect to a storage 14. The interface nodes $6a, 6b \ldots 6n$ further connect to one or more scanner nodes $16a, 16b \ldots 16n$ via the interface network 10, where the scanner nodes $16a, 16b \ldots 16n$ provide scanning services, such as anti-virus scanning, for file requests from the client nodes $2a, 2b \ldots 2n$. A management node 18 connects to the client network 4 and the interface network 10 to communication with the interface nodes $6a, 6b \ldots 6n$. The management node 18 further connects to the storage nodes $12a, 12b \ldots 12n$ and the scanner nodes $16a, 16b \ldots 16n$ over a management network 20.

The client nodes $2a, 2b \ldots 2n$ are assigned one of the interface nodes $6a, 6b \ldots 6n$ to which to direct file requests for the storage 14 resources. The interface nodes $6a, 6b \ldots 6n$ provision scanner services by selecting a scanner node $16a, 16b \ldots 16n$ to scan the file and provision storage services by selecting a storage node $12a, 12b \ldots 12n$ to provide storage resources at the storage 14 for the file request. Alternatively, the client nodes $2a, 2b \ldots 2n$ may select storage nodes $12a, 12b \ldots 12n$ and scanner nodes $16a, 16b \ldots 16n$ to use.

The client network 4, interface network 10, and management network 20 may utilize different network technologies. The networks 4, 10, and 20 may comprise a Local Area Network (LAN), Storage Area Network (SAN), Wide Area Network (WAN), wireless network, etc., which utilize a network protocol such as the Ethernet protocol, Transmission Control Protocol/Internet Protocol (TCP/IP), Fibre Channel protocol, Infiniband, Serial Advanced Technology Attachment (SATA), parallel SCSI, serial attached SCSI cable, etc., or any other network communication protocol known in the art. In one embodiment, the networks 4, 10, and 20 may comprise separate networks that utilize the same or different network and protocol technologies or may comprise fewer or more than the three networks 4, 10, and 20 shown in FIG. 1.

The client $2a, 2b \ldots 2n$, management 18, interface $6a, 6b \ldots 6n$, storage $12a, 12b \ldots 12n$, and scanner nodes $16a, 16b \ldots 16n$ may comprise servers or other computational devices known in the art. The network shown in FIG. 1 may implement an enterprise storage environment, such as the Scale Out Network Attached Storage (SONAS) offered by IBM.

The management node 18 may comprise a location independent station to manage the enterprise storage environment of FIG. 1. The interface nodes $6a, 6b \ldots 6n$ provide network paths supporting the client node $2a, 2b \ldots 2n$ connectivity to the storage nodes $12a, 12b \ldots 12n$ and scanner nodes $16a, 16b \ldots 16n$ on the interface network 10. Storage nodes $12a, 12b \ldots 12n$ provide access to the storage 14 and may include a storage controller to handle file requests to the storage 14.

In one embodiment, the scanner nodes $16a, 16b \ldots 16n$ maintain a definition set of definitions and scan files forwarded from the interface nodes $6a, 6b \ldots 6n$. In one embodiment, the scanner nodes $16a, 16b \ldots 16n$ may comprise anti-virus scanners and have a definitions set that comprises a virus definition file having definitions of malicious code. In such embodiments, the scanner nodes $16a, 16b \ldots 16n$ determine whether files have a subset of code matching the malicious code in the virus definition file. In such embodiments, the interface nodes 6a, 6b ... 6n continue processing a file request by forwarding to one of the storage nodes 12a, 12b ... 12n or executing the file request if the scanner node 16a, 16b ... 16n, selected by the interface node 6a, 6b ... 6n, indicates that the subset of code in the file does not mach any of the definitions of malicious code in the virus definition file, i.e., is not an infected file. In an alternative embodiment, the scanner nodes 16a, 16b ... 16n may determine whether the scanned file includes code, such as an alpha-numeric string or executable code, that matches definitions in the definition set, such that if there is a match, the file request is further processed and executed.

In the described embodiments, the interface nodes 6a, 6b ... 6n independently perform operations to select scanner nodes and forward file requests to the storage nodes 12a, 12b ... 12n based on the results of the scanner node 16a, 16b ... 16n scanning the file in the file request.

The storage 14 may comprise storage media implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, etc.

The reference designator "n" in the figures may indicate any positive integer value indicating a number of elements, where the reference "n", such as in 2n, 12n, and 16n may indicate the same or different number of elements when used with different elements, such as there may be a same or different number of client nodes 2a, 2b ... 2n, interface nodes 6a, 6b ... 6n, storage nodes 12a, 12b ... 12n and scanner nodes 16a, 16b ... 16n.

Figure 2:
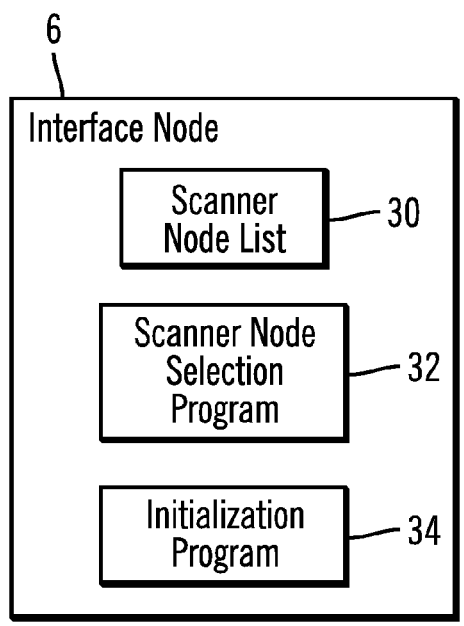
FIG. 2 illustrates an embodiment of an interface node.

FIG. 2 illustrates an embodiment of components in an interface node 6, comprising an implementation of the interface nodes 6a, 6b ... 6n, including a scanner node list 30 of scanners 16a, 16b ... 16n available through the interface network 10, a scanner selection program 32 executed by the interface nodes 6a, 6b ... 6n to select one of the scanner nodes 16a, 16b ... 16n to use to scan a file in a file request from a client node 2a, 2b ... 2n, and an initialization program 34 to set initial performance values for the scanner nodes indicted in the scanner node list 30, used by the interface nodes 6a, 6b ... 6n to select one scanner node 16a, 16b ... 16n.

Figure 3:
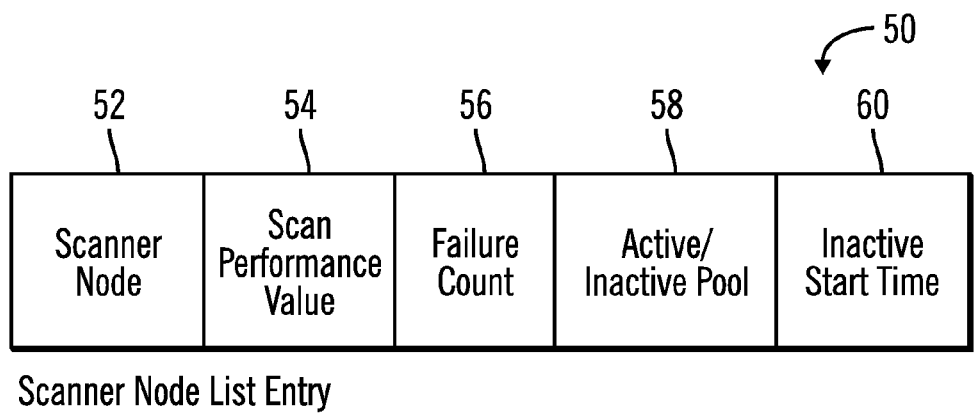
FIG. 3 illustrates an embodiment of an entry in a scanner node list.

FIG. 3 illustrates an embodiment of an entry 50 in the scanner node list 30 for each scanner node 16a, 16b ... 16n, including a scanner node identifier 52, a scan performance value 54 of the scanner node 52 scanning files, a failure count 56 indicating a number of times the scanner node 52 has failed scan operations, an active/inactive pool indicator 56 indicating whether the scanner node 52 is active or inactive, and an inactive start time 60 indicating a time the scanner node 52 was indicated as inactive in the inactive pool. In certain embodiments, the scan performance value 54 may comprise an average of scan rates observed at the scanner node 52 (e.g., 16a, 16b ... 16n), where a scan rate may be a function of a time for the scanner node 52 to complete the scan operation and a size of the file scanned. The scan performance value 54 may comprise an average of a last number of measured scan rates.

Figure 4:
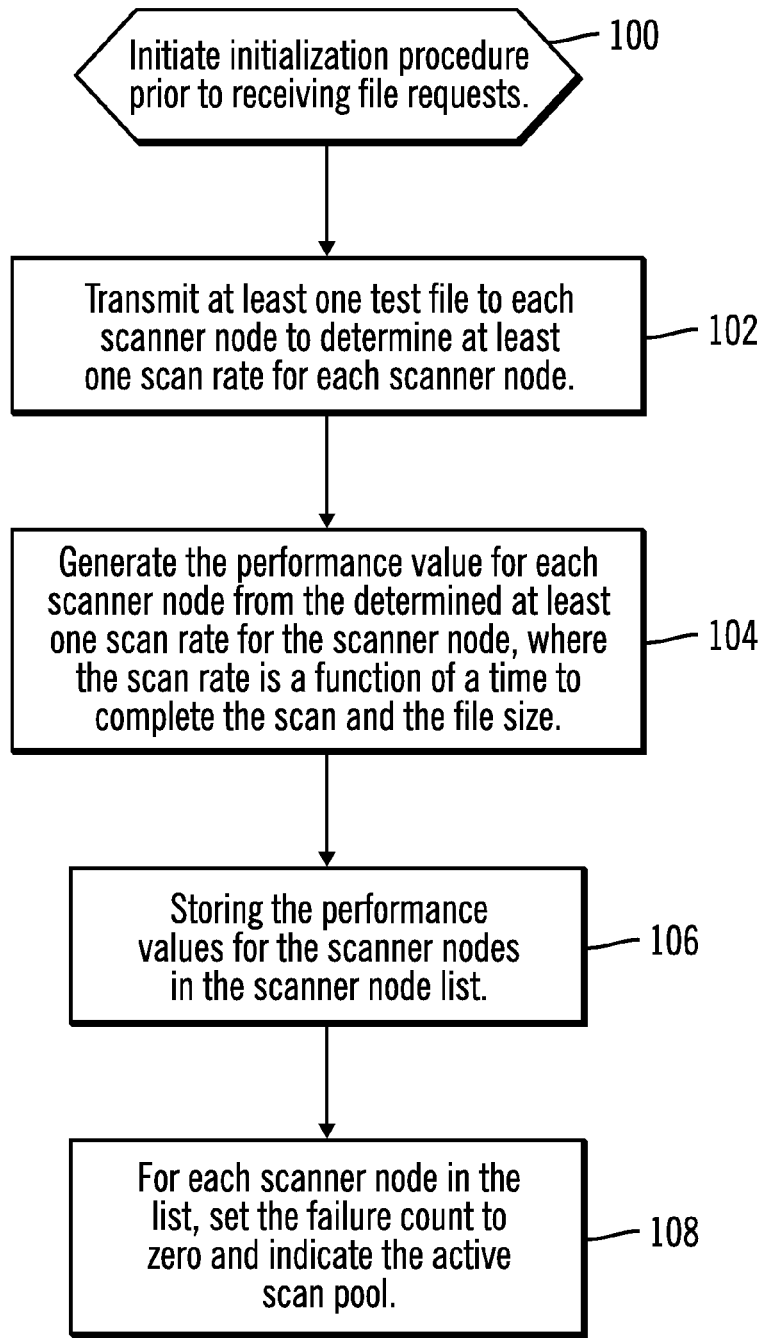
FIG. 4 illustrates an embodiment of operations to initialize scan performance values for scanner nodes in the scanner node list.

FIG. 4 illustrates an embodiment of operations implemented in the initialization program 34 that is executed by the interface node 6a, 6b ... 6n or another node in the network, such as the management node 18 or the scanner nodes 16a, 16b ... 16n, as part of an initialization procedure performed prior to the interface nodes 6a, 6b ... 6n processing client file requests, to set the performance values 52 for the scanner nodes in the list 30. The initialization program 34 operations in FIG. 4 may be performed independently by each interface node 6a, 6b ... 6n so the interface nodes 6a, 6b ... 6n independently determine the initial scan performance values 52 for the scanner nodes 16a, 16b ... 16n. In such case, the scan performance values 52 may reflect network latency specific to an interface node 6a, 6b ... 6n. In an alternative embodiment, one interface node 6a, 6b ... 6n or the management node 18 may perform the operations of FIG. 4 to determine the initial scan performance values 52 for the scanner nodes 16a, 16b ... 16n node in the scanner node list 30, and provide those initial scan performance values 52 to the interface nodes 6a, 6b ... 6n to use when processing file requests from the clients 2a, 2b ... 2n. In a yet further embodiment, the scanner nodes 16a, 16b ... 16n may each separately determine their scan performance values using one or more test files, and then transmit those to the interface nodes 6a, 6b ... 6n to use as the initial scan performance values 54.

With respect to FIG. 4, upon initiating (at block 100) the initialization procedure prior to receiving client file requests, the interface node 6a, 6b ... 6n or another node, transmits (at block 102) at least one test file to each scanner node 16a, 16b ... 16n to determine at least one scan rate for each scanner node 16a, 16b ... 16n. The interface node 16a, 16b ... 16n, or other component executing the initialization program 34, generates (at block 104) the performance value 54 for each scanner node from the determined at least one scan rate at the scanner node 16a, 16b ... 16n. The scan rate may be a function of a time to complete the scan and the file size. The scan rate may further include the time for the scanner node 16a, 16b ... 16n to transmit a response to the interface node 6a, 6n ... 6n. The executed initialization program 34 stores (at block 106) the performance values for the scanner nodes 16a, 16b ... 16n in the field 54 of the scanner node list 30. For each scanner node entry 50 in the list 30, the executed initialization program 34 sets (at block 108) the failure count 56 to zero and indicates the active scan pool in field 58.

Figure 5A:
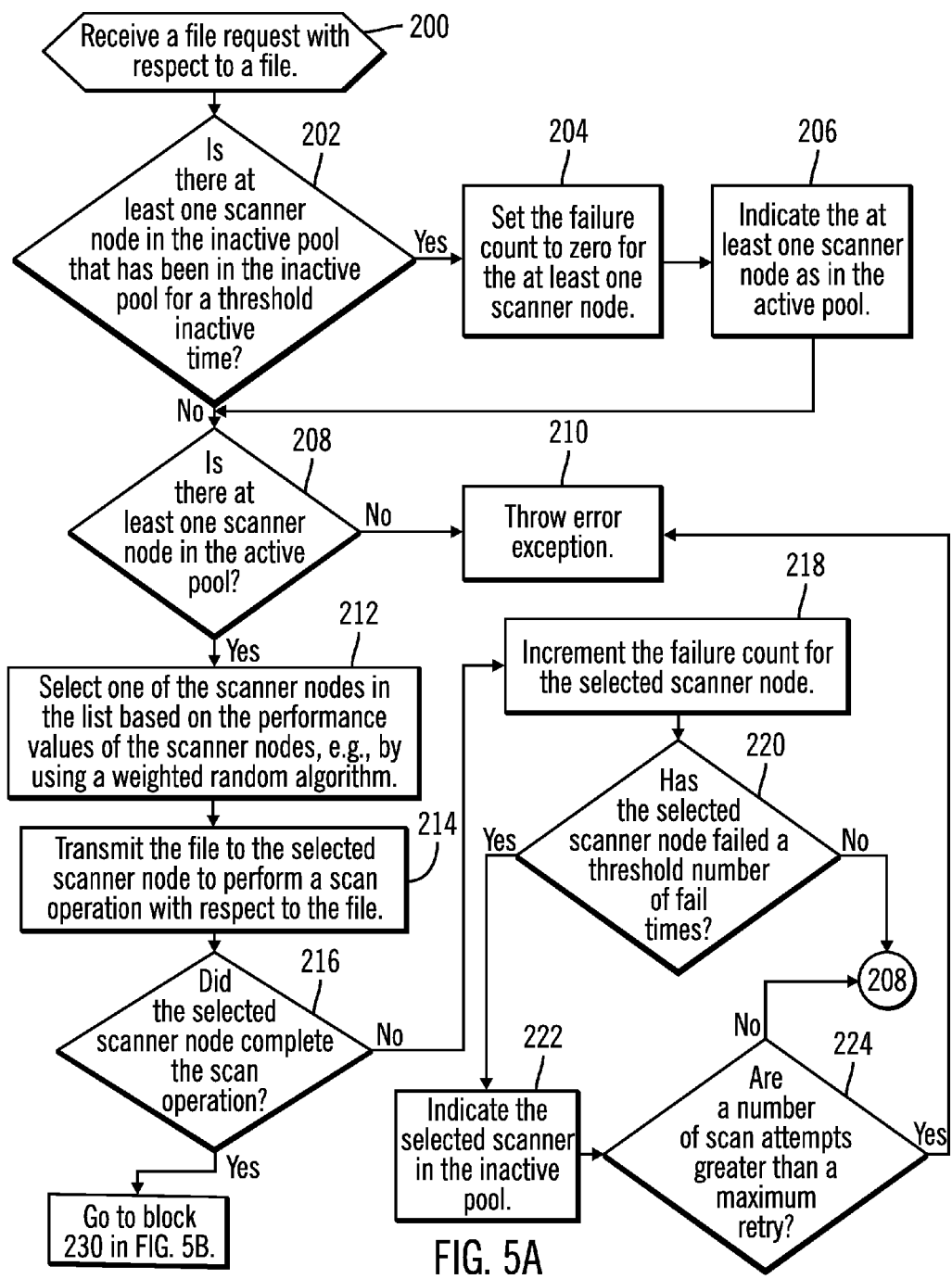
FIGS. 5a and 5b illustrate an embodiment of operations to select a scanner node in the scanner node list.
Figure 5B:
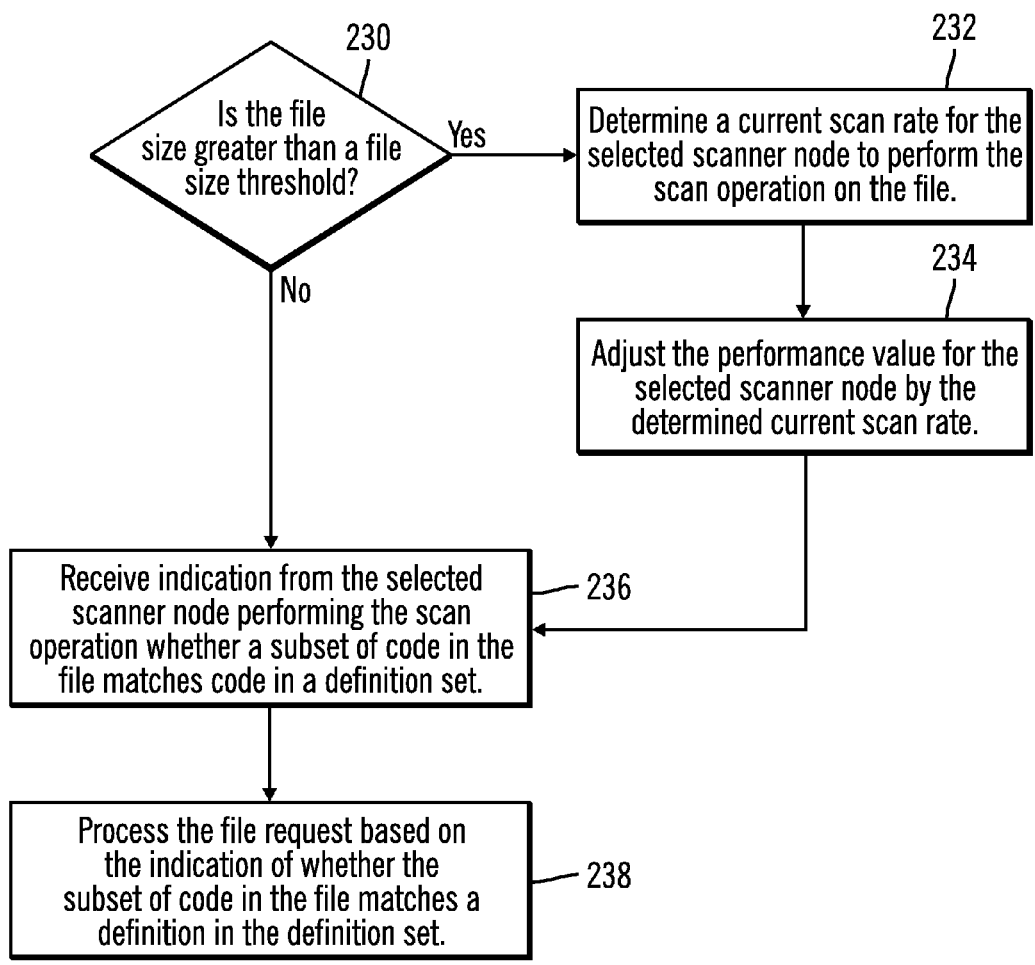

FIGS. 5a and 5b illustrate operations performed when the interface nodes 6a, 6b ... 6n execute the scanner selection program 32 to select a scanner node 16a, 16b ... 16n to scan the file. In response to receiving (at block 200) a file request with respect to a file from one of the client nodes 2a, 2b ... 2n, such as a write request, the executed scanner selection program 32 determines (at block 202) whether there is at least one scanner node 16a, 16b ... 16n indicated in the inactive pool that has been in the inactive pool for a threshold inactive time. For instance, the scanner selection program 32 may determine whether the current time less than the inactive start time 60 for inactive scanner nodes exceeds a threshold inactive time, which may be configured by a user. If (at block 202) at least one scanner node 16a, 16b ... 16bn has been indicated in the inactive pool for the threshold inactive time, then the scanner selection program 32 sets (at block 204) the failure count 56 to zero for each determined scanner node 16a, 16b ... 16n inactive for the threshold time. The determined at least one scanner node 16a, 16b ... 16n is further indicated (at block 206) as in the active pool by setting the field 58 to active. This ensures scanner nodes are inactive for only the threshold inactive time.

After returning scanner nodes 16a, 16b ... 16n to the active pool (from block 206) or if there are no scanner nodes 16a, 16b ... 16n that have been inactive for the threshold inactive time (from the no branch of block 202), the scanner selection program 32 determines (at block 208) whether there is at least one scanner node 16a, 16b ... 16n indicated in the active pool. If not, then an error exception is thrown (at block 210). If there are active scanner nodes 16a, 16b ... 16n, then the scanner selection program 32 selects (at block 212) one of the active scanner nodes 16a, 16b . . . 16n in the list 30 based on the scan performance values 54 of the active scanner nodes. In one embodiment, the scanner selection program 32 may use a weighted random algorithm to select one of the scanner nodes 16a, 16b . . . 16n. A weighted random algorithm may select a scanner node based on a probability value determined by the performance value of the scanner node. For instance, the scan performance values 54 may be used to assign weights to the scanner nodes, such that a scanner node having a higher performance value has a higher weight, or higher probability of being selected. A random number is generated and the weighted random algorithm selects one of the scanner nodes based on the weights assigned to the scanner nodes, wherein scanner nodes are selected proportionally to their weights such that the probability of a scanner node being selected is based on its performance value relative to the performance values of the other available scanner nodes 16a, 16b . . . 16n being considered. In alternative embodiments, alternative algorithms may be used to select a scanner node 16a, 16b . . . 16n based on the scan performance values of the active scanner nodes 16a, 16b . . . 16n.

The interface node 6a, 6b . . . 6n executing the scanner selection program 32 then transmits (at block 214) the file to the selected scanner node 16a, 16b . . . 16n to perform a scan operation with respect to the file. If (at block 216) the selected scanner node 16a, 16b . . . 16n did not successfully complete the scan operation, then the executed scanner selection program 32 increments (at block 218) the failure count 56 for the selected scanner node 16a, 16b . . . 16n and then determines (at block 220) whether the failed scanner node has failed a threshold number of fail times, which may comprise a user configurable value. If so, then the scanner selection program 32 indicates (at block 222) the selected scanner node as in the inactive pool, such as by setting the field 58 to indicate the inactive pool. If (at block 224) there have been a number of scan attempts greater than a maximum retry number, then an error exception is thrown (at block 210). If (at block 224) there have not been a maximum number of retries, then control proceeds to block 208 to retry the scan operation on another scanner node 16a, 16b . . . 16n. If (at block 220), the selected scanner node has not failed the threshold number of times, then control proceeds to block 208 to retry the scan operation. If (at block 216) the scanner node successfully completed the scan operation, indicating that the file includes a subset of code matching or not matching a definition in a definition set, then control proceeds to block 230 in FIG. 5b.

With respect to FIG. 5b, if (at block 230) the file size is greater than a file size threshold, then the scanner selection program 32 is executed to determine (at block 232) a current scan rate for the selected scanner node 16a, 16b . . . 16n to perform the scan operation on the file. The scan rate may be a function of the time for the selected scanner node 16a, 16b . . . 16b to perform the scan operation and the file size, such as time divided by the file size. The scan rate may be provided by the scanner node 16a, 16b . . . 16n to the interface node 6a, 6b . . . 6n or may be measured by the interface node 6a, 6b . . . 6n based on the time taken for the selected scanner node 16a, 16b . . . 16n to indicate the result of the scan operation, i.e., whether the file has a subset of code matching a definition in a definition set used by the scanner node 16a, 16b . . . 16n. The executed scanner selection program 32 may then adjust the performance value 54 for the selected scanner node by the determined current scan rate. In one embodiment, the performance value may comprise an average of the current scan rate and a predetermined number of previously determined scan rates. The average may comprise a simple average or weighted average. Alternatively, the performance value may be set to the determined current scan rate. In further embodiments, further algorithms may be used to determine an adjusted scan performance value based on the scan rate. The scanner selection program 32 may receive (at block 236) indication from the selected scanner node performing the scan operation whether a subset of code in the file matches a definition in a definition set, such as a virus definition file. The scanner selection program 32 processes (at block 238) the file request based on the indication of whether the subset of code in the file matches a definition in the definition set.

In an embodiment where the selected scanner node 16a, 16b . . . 16n is performing anti-virus checking, the interface node 6a, 6b . . . 6n performing the selection, would forward the file request to a storage node 12a, 12b . . . 12n to service the file request upon the selected scanner node 16a, 16b . . . 16n indicating to the interface node 6a, 6b . . . 6n that the file does not have code matching a malicious definition in the virus definition file. In an alternative embodiment, the interface node 6a, 6b . . . 6n may forward the file request and file to a storage node 12a, 12b . . . 12c to service upon the scanner node determining that the file has code or a subset of code matching a definition in the definition set. In a still further embodiment, the interface node 6a, 6b . . . 6n may service the file request itself, without forwarding to the storage node 12a, 12b . . . 12n based on the selected scanner node 16a, 16b . . . 16n indicating a result that specifies that the file request should be executed. If the scanner node 16a, 16b . . . 16n returns a result indicating that the file request should not be executed, then the interface node 6a, 6b . . . 6n may return an error message to the client node 2a, 2b . . . 2n initiating the request indicating the reason why the file request will not be processed.

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing implementation is described with respect to FIGS. 6-8. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 6 illustrates an example of a cloud computing node 300 which may comprise an implementation of one of the nodes 2a, 2b . . . 2n, 6a, 6b . . . 6n, 12a, 12b . . . 12n, 16a, 16b . . . 16n, and 18. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 300 there is a computer system/server 302, which is operational with numerous other general purpose or special purpose computing system environments or configurations. Examples of well-known computing systems, environments, and/or configurations that may be suitable for use with computer system/server 302 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 302 in cloud computing node 300 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Figure 7:
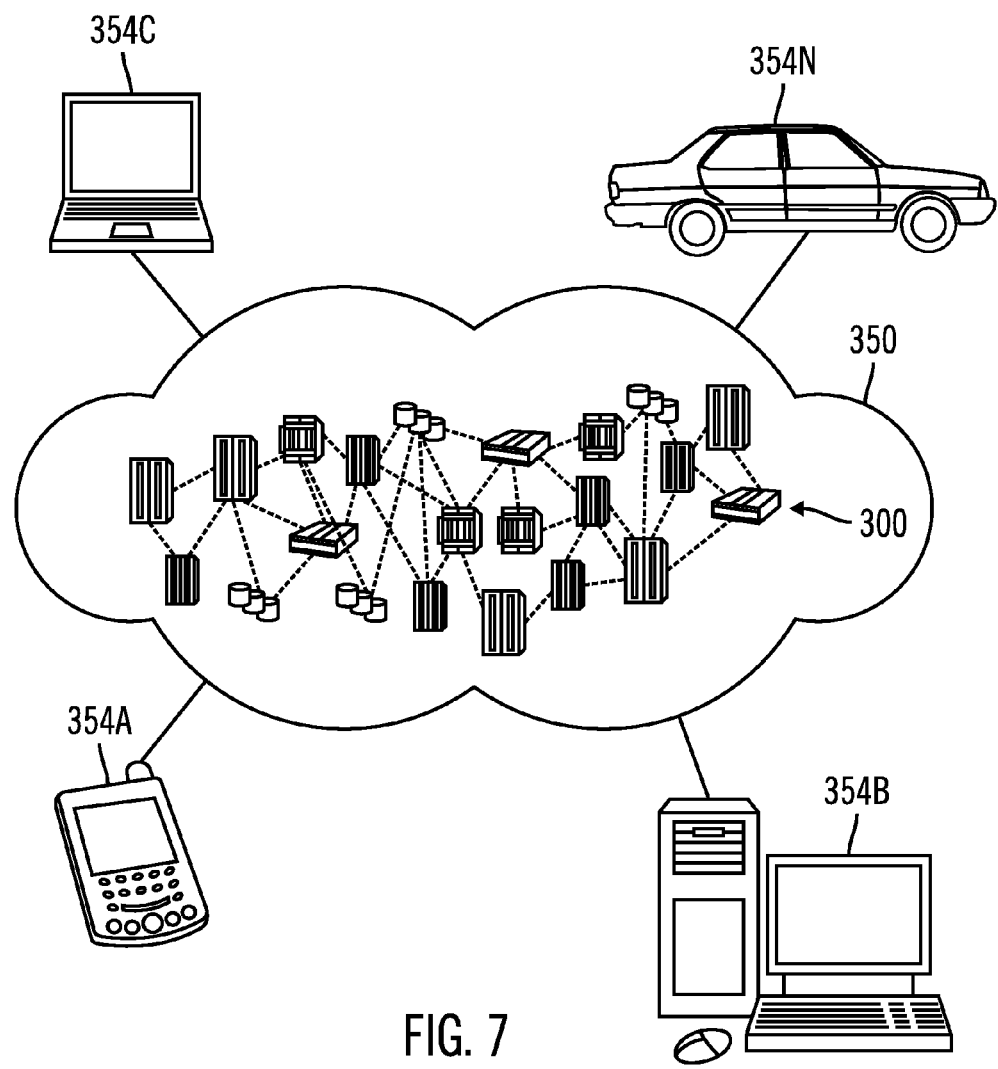
FIG. 7 illustrates an embodiment of a cloud computing environment.

Referring now to FIG. 7, illustrative cloud computing environment 350 is depicted. As shown, cloud computing environment 350 comprises one or more cloud computing nodes 300 with which local computing devices used by cloud consumers, such as, for example, personal digital assistant (PDA) or cellular telephone 354A, desktop computer 354B, laptop computer 354C, and/or automobile computer system 354N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 7 are intended to be illustrative only and that computing nodes 10 and cloud computing environment 350 can communicate with any type of computerized device over any type of network and/or network addressable connection (e.g., using a web browser).

Figure 8:
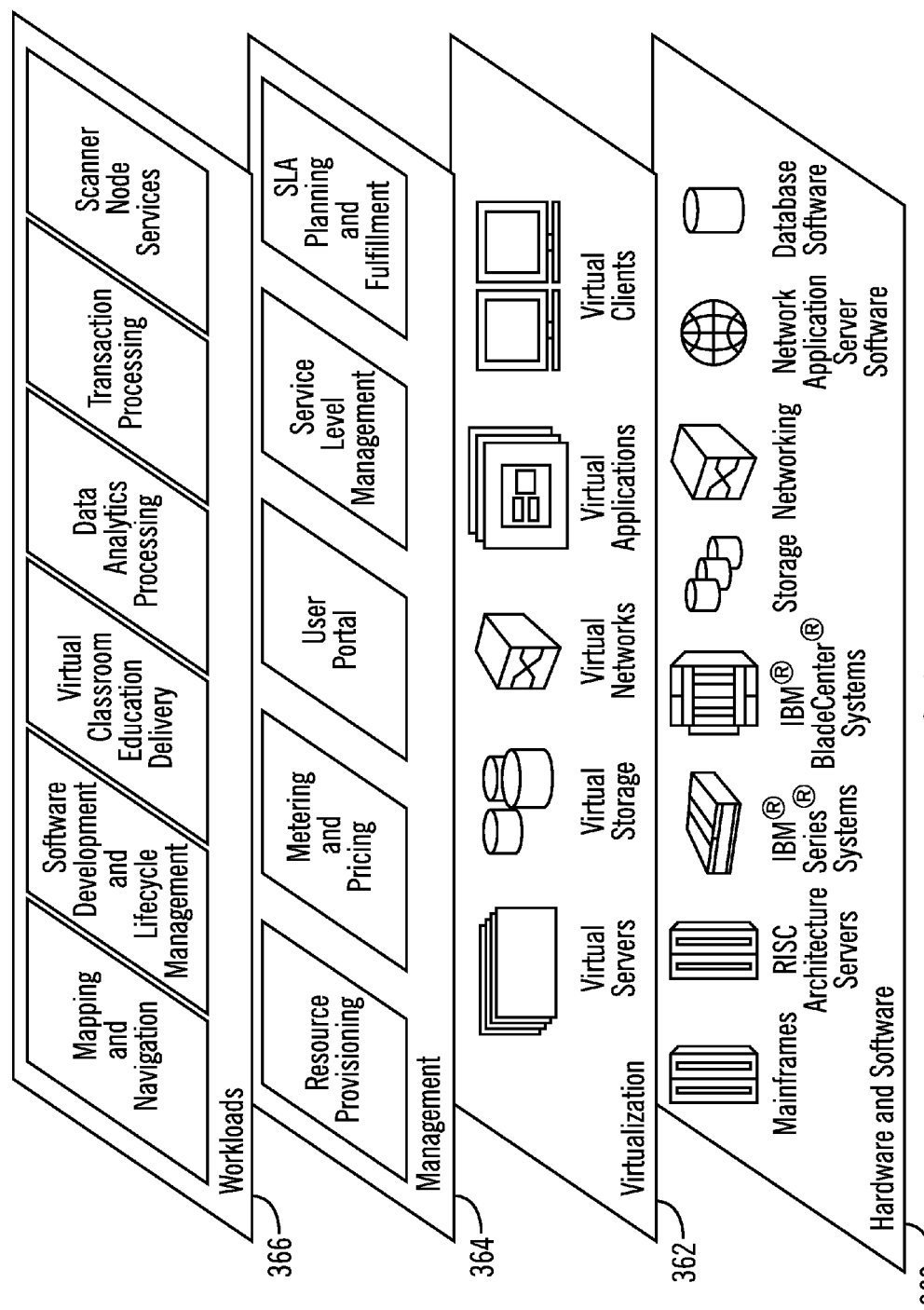
FIG. 8 illustrates an embodiment of abstraction model layers of a cloud computing environment.

Referring now to FIG. 8, a set of functional abstraction layers provided by cloud computing environment 350 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the scanner node services, such as described with respect to FIGS. 1-4 and 5a, and 5b above.

Described embodiments provide techniques for interface nodes providing interface services for client nodes with respect to a storage to select one of a plurality of scanner nodes to scan a file part of a client file request before forwarding the file and file request to a storage node to service. Described embodiments provide techniques to select a scanner node to scan a file subject to a client file request using scan performance values of a plurality of listed scanner nodes that are available to perform a scan operation for a file.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5*a*, and 5*b* show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for scanning files in a network environment including a plurality of scanner nodes, the computer program product comprising a computer readable storage medium having computer readable program code embodied therein that executes to perform operations, the operations comprising:
   providing a list of the scanner nodes in the network and for each of the scanner nodes a performance value, wherein the performance value for each of the scanner nodes comprises a scan rate that is a function of at least a time for the scanner node to complete a scan operation;
   receiving a file request with respect to a file;
   in response to the file request, selecting one of the scanner nodes in the list based on the performance values of the scanner nodes;
   transmitting the file to the selected scanner node to perform the scan operation with respect to the file;
   receiving indication from the selected scanner node performing the scan operation whether a subset of code in the file matches code in a definition set;
   processing the file request to result in execution of the file request based on the indication of whether the subset of code in the file matches a definition in the definition set;
   determining a current scan rate for the selected scanner node to perform the scan operation on the file in response to the scanner node completing the scan operation; and
   adjusting the performance value for the selected scanner node by the determined current scan rate, wherein the adjusted performance value is used for subsequent file requests to determine the scanner node based on the performance values.

2. The computer program product of claim 1, wherein the scanner nodes comprise anti-virus scanners, wherein the definition set comprises a virus definition file having definitions of malicious code, wherein the scanner nodes determine whether files have a subset of code matching the malicious code in the virus definition file, and wherein the file request is processed to execute in response to the selected scanner node indicating that the subset of code in the file does not match one of the definitions of malicious code in the virus definition file.

3. The computer program product of claim 1, wherein scanner nodes are indicated in one of an active pool or an inactive pool, wherein determining one of the scanner nodes comprises determining one of the scanner nodes from the active pool, wherein the operations further comprise:
   determining whether there is at least one scanner node in the inactive pool that has been in the inactive pool for a threshold inactive time; and
   indicating the determined at least one scanner node that has been in the inactive pool for the threshold inactive time as in the active pool.

4. The computer program product of claim 3, wherein the operations further comprise:
   determining that the selected scanner node did not complete the scan operation;
   determining whether the selected scanner node has failed the scan operation a threshold number of fail times; and
   indicating the determined scanner in the inactive pool in response to determining that the selected scanner node has failed the scan operation the threshold number of fail times.

5. The computer program product of claim 1, wherein the scan rate is further a function of a size of the file scanned.

6. The computer program product of claim 5, wherein the operations further comprise:
   determining whether the file size is greater than a file size threshold in response to the scanner node completing the scan operation, wherein the operations of the determining of the current scan rate and the adjusting of the performance value are performed in response to determining that the file size is greater than the file size threshold.

7. The computer program product of claim 5, wherein the operations further comprise:
   performing an initialization procedure prior to receiving file requests, comprising:
   transmitting at least one test file to each scanner node to determine at least one scan rate for each scanner node; and
   generating the performance value for each scanner node from the determined at least one scan rate for the scanner node, wherein the performance values generated during the initialization procedure for the scanner nodes are used when processing the file requests following the initialization procedure.

8. The computer program product of claim 1, wherein the determining of one of the scanner nodes comprises:
   using the performance values to assign weights to the scanner nodes;
   generating a random number; and
   using a weighted random algorithm to select one of the scanner nodes based on the weights assigned to the scanner nodes, wherein scanner nodes are selected proportionally to their weights.

9. The computer program product of claim 1, wherein a plurality of interface nodes receive file requests from a plurality of client nodes, wherein the interface nodes are coupled to the scanner nodes, and wherein each interface node independently performs the operations of providing the list of scanner nodes, receiving the file requests, determining one of the scanner nodes, transmitting the files to the selected scanner nodes, receiving indications from the selected scanner nodes, and processing the file requests to provision scanner and storage services to the client nodes in a network environment.

10. The computer program product of claim 9, wherein the interface nodes are further in communication with storage nodes providing storage services, wherein the interface nodes process each file request to execute by forwarding the file and the file request to one of the storage nodes in response to determining that the received indication on the result of the matching indicates to execute the file request, and wherein the storage nodes provision the storage services by executing the file request with respect to a storage space.

11. A system for scanning files, coupled to a network including a plurality of scanner nodes, comprising:
  a processor; and
  a computer readable storage medium having computer readable program code embodied therein that executes to perform operations, the operations comprising:
    providing a list of the scanner nodes in the network and for each of the scanner nodes a performance value, wherein the performance value for each of the scanner nodes comprises a scan rate that is a function of at least a time for the scanner node to complete a scan operation;
    receiving a file request with respect to a file;
    in response to the file request, selecting one of the scanner nodes in the list based on the performance values of the scanner nodes;
    transmitting the file to the selected scanner node to perform the scan operation with respect to the file;
    receiving indication from the selected scanner node performing the scan operation whether a subset of code in the file matches code in a definition set;
    processing the file request to result in execution of the file request based on the indication of whether the subset of code in the file matches a definition in the definition set;
    determining a current scan rate for the selected scanner node to perform the scan operation on the file in response to the scanner node completing the scan operation; and
    adjusting the performance value for the selected scanner node by the determined current scan rate, wherein the adjusted performance value is used for subsequent file requests to determine the scanner node based on the performance values.

12. The system of claim 11, wherein the scanner nodes comprise anti-virus scanners, wherein the definition set comprises a virus definition file having definitions of malicious code, wherein the scanner nodes determine whether files have a subset of code matching the malicious code in the virus definition file, and wherein the file request is processed to execute in response to the selected scanner node indicating that the subset of code in the file does not match one of the definitions of malicious code in the virus definition file.

13. The system of claim 11, wherein the scan rate is further a function of a size of the file scanned.

14. The system of claim 13, wherein the operations further comprise:
  performing an initialization procedure prior to receiving file requests, comprising:
    transmitting at least one test file to each scanner node to determine at least one scan rate for each scanner node; and
    generating the performance value for each scanner node from the determined at least one scan rate for the scanner node, wherein the performance values generated during the initialization procedure for the scanner nodes are used when processing the file requests following the initialization procedure.

15. A system coupled to client nodes over a network, comprising:
  a plurality of interface nodes and scanner nodes that communicate over the network;
  wherein the interface node independently execute code to process file requests from the client nodes to provision scanner services at the scanner nodes and storage services to the client nodes and to perform operations, the operations comprising:
    providing a list of a plurality of scanner nodes in the network and for each scanner node a performance value, wherein the performance value for each of the scanner nodes comprises a scan rate that is a function of at least a time for the scanner node to complete a scan operation;
    receiving a file request with respect to a file;
    in response to the file request, selecting one of the scanner nodes in the list based on the performance values of the scanner nodes;
    transmitting the file to the selected scanner node to perform the scan operation with respect to the file;
    receiving indication from the selected scanner node performing the scan operation whether a subset of code in the file matches code in a definition set;
    processing the file request to result in execution of the file request based on the indication of whether the subset of code in the file matches a definition in the definition set;
    determining a current scan rate for the selected scanner node to perform the scan operation on the file in response to the scanner node completing the scan operation; and
    adjusting the performance value for the selected scanner node by the determined current scan rate, wherein the adjusted performance value is used for subsequent file requests to determine the scanner node based on the performance values.

16. The system of claim 15, further comprising:
  a plurality of storage nodes coupled to a storage space, wherein the storage nodes provide storage services to the client nodes that communicate with the interface nodes over the network;
  wherein the interface nodes process each file request to execute by forwarding the file and the file request to one of the storage nodes in response to determining that the received indication on the result of the matching indicates to execute the file request, and wherein the storage nodes provision the storage services by executing the file request with respect to a storage space.

17. A method, comprising:
  providing a list of a plurality of scanner nodes in a network and for each scanner node a performance value, wherein the performance value for each of the scanner nodes comprises a scan rate that is a function of at least a time for the scanner node to complete a scan operation;
  receiving a file request with respect to a file;
  in response to the file request, selecting one of the scanner nodes in the list based on the performance values of the scanner nodes;
  transmitting the file to the selected scanner node to perform the scan operation with respect to the file;
  receiving indication from the selected scanner node performing the scan operation whether a subset of code in the file matches code in a definition set;
  processing the file request to result in execution of the file request based on the indication of whether the subset of code in the file matches a definition in the definition set;
  determining a current scan rate for the selected scanner node to perform the scan operation on the file in response to the scanner node completing the scan operation; and
  adjusting the performance value for the selected scanner node by the determined current scan rate, wherein the adjusted performance value is used for subsequent file requests to determine the scanner node based on the performance values.

18. The method of claim 17, wherein the scanner nodes comprise anti-virus scanners, wherein the definition set comprises a virus definition file having definitions of malicious code, wherein the scanner nodes determine whether files have a subset of code matching the malicious code in the virus definition file, and wherein the file request is processed to execute in response to the selected scanner node indicating that the subset of code in the file does not match one of the definitions of malicious code in the virus definition file.

19. The method of claim 17, wherein the scan rate is further a function of a size of the file scanned.

20. The method of claim 19, further comprising:
performing an initialization procedure prior to receiving file requests, comprising:
transmitting at least one test file to each scanner node to determine at least one scan rate for each scanner node; and
generating the performance value for each scanner node from the determined at least one scan rate for the scanner node, wherein the performance values generated during the initialization procedure for the scanner nodes are used when processing the file requests following the initialization procedure.

21. The method of claim 17, independently performing, at interface nodes coupled to the scanner nodes, the operations of providing the list of scanner nodes, receiving the file requests, determining one of the scanner nodes, transmitting the files to the selected scanner nodes, receiving indications from the selected scanner nodes, and processing the file requests to provision scanner and storage services to client nodes in a network environment.

22. The method of claim 21, processing, at the interface node, each file request to execute by forwarding the file and the file request to one of a plurality of storage nodes in response to determining that the received indication on the result of the matching indicates to execute the file request, and wherein the storage nodes provision the storage services by executing the file request with respect to a storage space.

* * * * *